United States Patent [19]

Sato et al.

[11] Patent Number: 4,825,113
[45] Date of Patent: Apr. 25, 1989

[54] SINGLE TRANSMISSION LINE BIDIRECTIONAL OPTICAL COMMUNICATION SYSTEM

[75] Inventors: Hirochika Sato; Haruo Nakayama; Takeshi Uchiyama; Yoshihisa Hagami; Yoshiro Sato, all of Tokyo, Japan

[73] Assignee: Seiko Instruments Inc., Tokyo, Japan

[21] Appl. No.: 12,354

[22] Filed: Feb. 9, 1987

[30] Foreign Application Priority Data

Mar. 3, 1986 [JP] Japan ................... 61-45881

[51] Int. Cl.$^4$ ............................................. H04B 9/00
[52] U.S. Cl. ...................................... 370/2; 455/606; 455/612
[58] Field of Search ............... 370/2, 1; 455/616, 606, 455/602, 612, 607

[56] References Cited

U.S. PATENT DOCUMENTS 4,025,194 5/1977 Teppo .................................. 455/606
4,709,414 11/1987 So et al. .............................. 455/612

Primary Examiner—Benedict V. Safourek
Assistant Examiner—Andrew J. Telesz, Jr.
Attorney, Agent, or Firm—Bruce L. Adams; Van C. Wilks

[57] ABSTRACT

A single transmission line bidirectional optical communication system comprising a directional coupler employing a polarizing beam splitter, an optical transmitting circuit for coding the data and converting the coded data into optical signals and outputting said signals, an optical receiving circuit employing a comparator having a function of automatically establishing a threshold for converting optical input signals into electrical signals and then decoding the data, a circuit for detecting the frequency differences between the sending signals and receiving signals, and a line diagnosing circuit.

The polarizing beam splitter eliminates a near-end reflected beam, and the optical receiving circuit having a function of automatically establishing a threshold eliminates a remote-end reflected beam. The line diagnosing circuit diagnoses the line condition by comparing the sending frequency and receiving frequency.

16 Claims, 5 Drawing Sheets

SINGLE TRANSMISSION LINE BIDIRECTIONAL OPTICAL COMMUNICATION SYSTEM

BACKGROUND OF THE INVENTION

1. Field of the Invention

The present invention relates to an optical communication system capable of performing bidirectional data communications through a single transmission line between two distant places.

2. Description of the Prior Art

In single line bidirectional communication using the single transmission line, e.g., one optical fiber, the prior art is accompanied by the problem of a crosstalk in which an optical signal transmitted by itself is mixed into the optical signal from a remote side. This problem is caused, in a multiple optical wavelength system changing the mutual optical communication wavelengths and separating them by using a branching filter, by the crosstalk due to insufficient separation between the optical wavelengths and, in an identical optical wavelength system using a directional coupler, by the crosstalk due to a reflected beam at the connected point of the optical fiber.

As a countermeasure, it is conceived in the prior art to sufficiently widen the interval between the individual wavelengths in the multiple optical wavelength system. As a result, the prior art is defective in a remarkably high cost and is impractical because of the use of a light emitting element of special wavelength and because of the requirement of the branching filter to be made highly precisely. In the identical optical wavelength system, on the other hand, the influences of the reflected beam are prevented by setting the threshold voltage Vth of the optical receiving circuit at a higher level than that of the reflected beam intensity by means of a half-fixed resistor or a changeover switch. This system is constructed at a lower cost because it can be constructed of an optical transmitting circuit of the same wavelength and of the directional coupler, but has to have the threshold voltage adjusted, each time the system is installed, so as not to detect the reflected beam but to detect only the signal beam because the threshold voltage Vth is fixed. In the case of a long-range communication in which the signal beam becomes weak, moreover, the difference between the signal voltage and the threshold voltage becomes so small as to facilitate degradation of the bit error rate (i.e., BER) so that the system can be used only for a short-range communication. Still moreover, the directional coupler of the prior art cannot eliminate the near-end reflection, because it uses a half mirror, so that it makes impossible the long-range communication in which the signal beam becomes weak.

Furthermore, in case the power supply of the remote communication system is OFF or in case the optical fiber is not connected or cut, the single line bidirectional communication of the prior art is accompanied by a problem that the intra-office station will detect the carrier outputted from itself, when its power supply is ON, to judge as if the communication circuit would be set. This makes it necessary for the user to confirm every time whether or not the circuit is really set. Moreover, the abnormality of the line in operation cannot be easily detected for the same reason.

SUMMARY OF THE INVENTION

An object of the present invention is to provide a single transmission line bidirectional optical communication system which can reduce the influences of a reflected beam in an identical optical wavelength communication to conduct long distance communication at a reasonable cost and to remarkably improve the practical usability, operability and reliability.

In order to solve the above-specified problems, according to the present invention, the bidirectional optical communication system using a single transmission line is equipped with a directional coupler, an optical transmitting circuit, an optical receiving circuit, an optical output controlling circuit, a frequency discriminating circuit, a clock controlling circuit and a line diagnosing circuit and is intended to reduce the influences of a near-end reflected beam by using a polarizing beam splitter as the directional coupler, and to reduce the influences of the reflected beam by combining the concept of making the time average of an optical signal intensity substantially constant by coding data with the optical transmitter and the concept of automatically setting the threshold level at a substantially average value of the input signal intensity by the automatic threshold value controller and using the optical receiving circuit ignoring a reflected beam of a lower signal intensity than said threshold level. On the other hand, the still remaining small influences due to the reflected beam can be completely eliminated through a frequency separation by the fact that the output of the optical transmitting circuit outputting the coded data containing clock information is stopped for a constant time after a power supply or a reset operation by the optical output controlling circuit, and that the communication line is set during the stoppage of the output of the optical transmitting circuit by the selection of the transmission clock signal, which is different from that adopted by a remote-side communication system, from the reproduced clock obtained on the optical receiving circuit by receiving and decoding the optical signal on the transmission line. A long distance transmission using the single transmission line can be accomplished by the combination described above, and a disorder of the remote-side communication system and trouble in the transmission line, if any, can be immediately detected to remarkably enhance the practical usability and reliability by automatically setting the circuit and by always making a comparison between the reproduced clock frequency and its own transmission clock frequency even after the line setting by the line diagnosing circuit.

DETAILED DESCRIPTION OF THE PREFERRED EMBODIMENT

Figure 1:
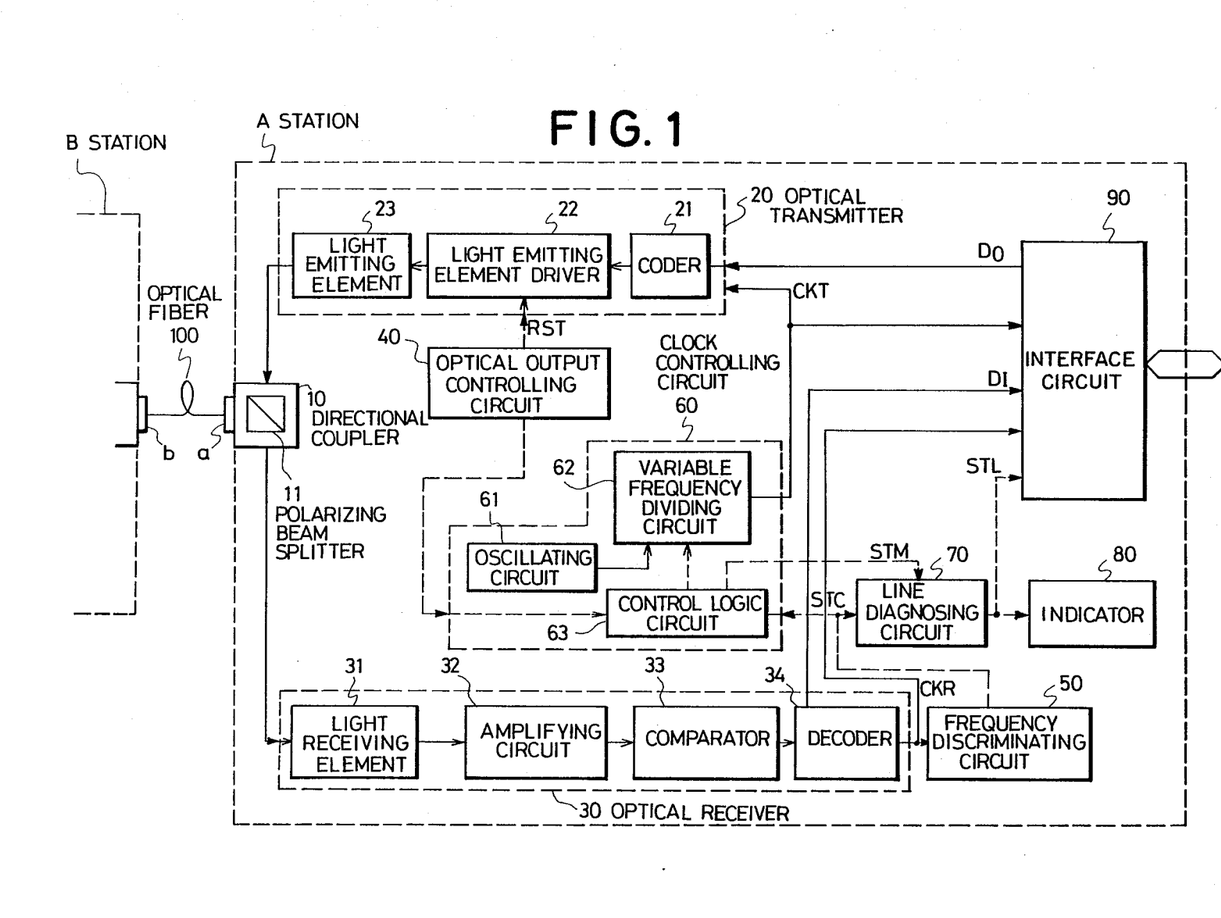
FIG. 1 is a block diagram showing the overall construction of the communication system of the present invention.
Figure 2A:
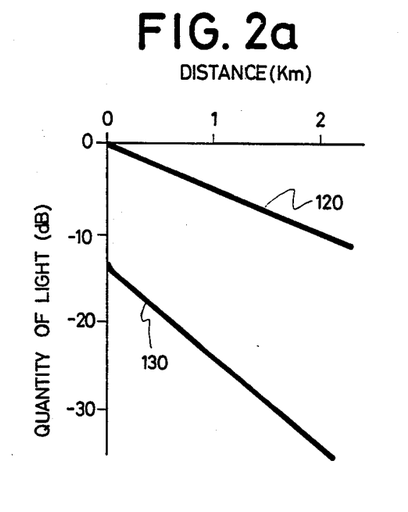
FIGS. 2a and 2b are diagrams showing the relationships between the quantity of the reflected beam and the distance of the optical fiber.
Figure 2B:
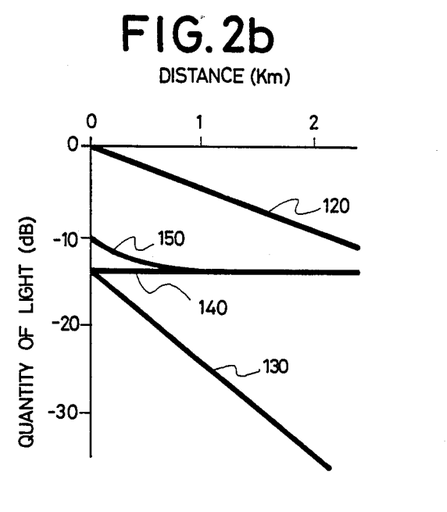
Figure 3:
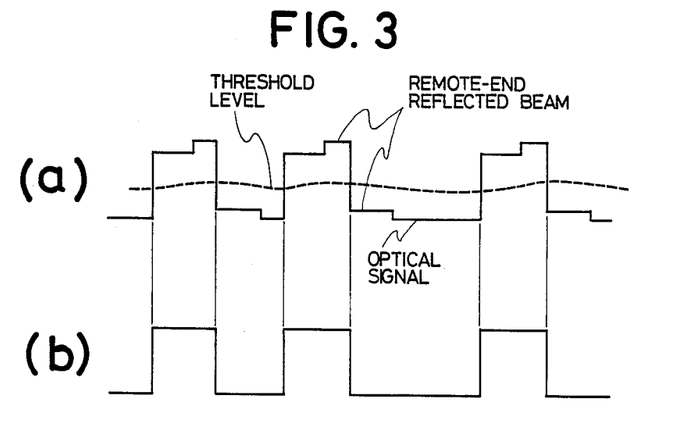
FIGS. 3a and 3b are waveform charts of the optical signal, the reflected beam and the reproduced electric signal.

The embodiments of the present invention will be described in the following with reference to the accompanying drawings. FIG. 1 shows one embodiment of the present invention; FIG. 2 shows the relationship between the quantity of a reflected beam and the length of an optical fiber; FIG. 3 is a waveform chart showing an optical signal, a reflected beam and a reproduced electric signal; FIG. 4 is a timing chart when a circuit is set, i.e., when a clock frequency is determined, and FIG. 5 is a timing chart when in operation. In FIG. 1, a transmission data DO introduced in synchronism with a transmission clock CKT from an interface circuit 90 taking charge of data exchange with an external data terminal (not shown in the drawing) is transmitted to an optical transmitter 20. Then, the data DO passes through both a coder 21, which is operative to code data into its own clock code in response to the transmission clock CKT outputted from a clock controlling circuit 60, and a light emitting element driver 22, which is operative to drive a light emitting element such as a light emitting diode (i.e., LED) or a semiconductor laser (i.e., LD), and is subjected to electro-optical conversion by a light emitting element 23 until it is outputted to a directional coupler 10. The ideal coding type should have a mark percentage of 50% of the Manchester code or the CMI code. This is because the optical signal intensity is constant. Incidentally, if the coding type has some regularity, it does not obstruct the effect of the present invention but should not be limited by the present invention. The transmitted optical signal is polarized and branched by the directional coupler 10 using a polarizing beam splitter 11 so that it comes into an optical fiber 100, through which it is transmitted to a remote-side communication system (i.e., a B station). The beam reflected at the near end (i.e., the a end) of the optical fiber 100 is filtered out by the polarizing beam splitter 11 to fail to enter a light receiving element 31 because it reverses the polarization. On the contrary, the beam reflected from the remote end (i.e., the b end) of the optical fiber 100 and the signal beam from the B station are held in unpolarized states, because they have propagated through the optical fiber, so that they pass through the polarizing beam splitter 11 until they are guided into the light receiving element 31 of an optical receiver 30. The relationship between the aforementioned quantity of the reflected beam and the length of the optical fiber is shown in FIG. 2. Line 120 denotes the quantity of signal beam. Line 130 denotes the quantity of remote-end reflected beam, line 140 denotes the quantity of near-end reflected beam, and line 150 denotes total reflected beam. It is assumed that the quantity of light inputted to the light receiving element be at 0 dB for a distance of 0, that the signal beam be attenuated at a rate of 5 dB/km by the optical fiber 100, and that the reflections at each of the end faces (i.e., the a and b points) of the optical fiber be at −14 dB. FIG. 2a shows the case in which the polarizing beam splitter is used. Since, in this case, the reflection of the beam occurs not at the near end but the remote end, the reflected beam is attenuated at a rate of 10 dB/km two times as large as that of the signal beam to the length of the optical fiber. As a result, the signal beam and the reflected beam have a large intensity difference for a long range so that they can be easily separated to effect the long distance communication. At the branch point using the half mirror of the prior art, as shown in FIG. 2b, the near-end reflected beam cannot be eliminated so that the total reflected beam is the summation of the near-end reflected beam and the remote-end reflected beam. At a long distance where the signal beam becomes weak, the signal beam and the reflected beam cannot be separated to make the long distance communication impossible.

Reverting to FIG. 1, the beam incident upon the light receiving element 31 is converted into an electric signal, which is amplified by an amplifying circuit 32 and inputted to a comparator 33. This comparator 33 is equipped therein with an automatic threshold value controlling circuit for automatically setting the threshold level at a substantially average value of the input signal intensities. As shown in FIG. 3a, the threshold level crosses the substantially average value of the optical signal so that the remote-end reflected beam is ignored to allow only the signal beam from the remote station to be reproduced, as shown in FIG. 3b. The reproduced electric signal from the comparator 33 is reproduced and separated into data DI and a clock CKR by decoder 34, the former DI of which is sent through the interface circuit 90 to the external data terminal whereas the latter CKR of which is sent to a frequency discriminating circuit 50. The clock is further sent as a synchronizing clock necessary for introducing the data DI into the interface circuit 90.

The optical output controlling circuit 40 outputs a control signal RST for controlling whether or not an optical signal is to be outputted from the optical transmitting circuit 20.

The received clock frequency is discriminated by the frequency discriminating circuit 50 and informs the clock controlling circuit 60 and a line diagnosing circuit 70 by a status signal STC indicating the received clock frequency.

Figure 4A:
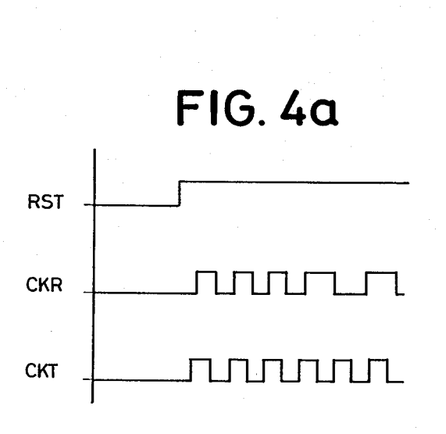
FIGS. 4a and 4b are timing charts when in the operation.
Figure 4B:
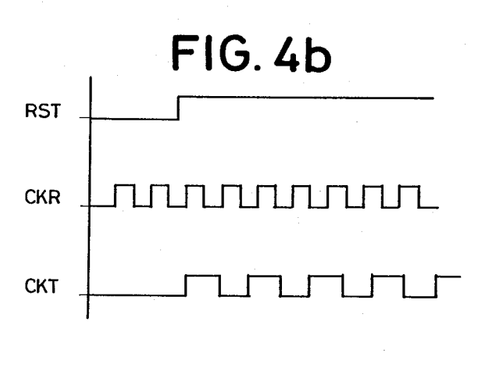

In the state where the communication line has to be immediately set as upon the turning on of the power supply or after the reset operation, the optical output controlling circuit 40 uses the control signal RST to stop the optical output of the optical transmitting circuit 20 thereby not to output its own optical signal to the optical fiber. Since the optical receiving circuit 30 is operating at this time, it must be outputting the data DI and the clock CKR, if the B station is operating (i.e., outputting the optical signal), but does not produce an output because it does not receive an input, when the B station is not started yet. This behavior is shown in the timing chart of FIG. 4. FIG. 4a shows the case in which the intra-office station starts earlier than the remote station and has no output, while the RST is OFF, to have no received optical signal from the reflected beam so that nothing exists in the reproduced clock CKR. FIG. 4b shows the case in which the remote station starts earlier than the intra-office station and receives only the signal beam from the remote station, while the RST is OFF, so that the reproduced clock CKR has the frequency used by the remote station. During the RST OFF, the status signal STC of the frequency discriminating circuit 50 made receptive of such clock CKR to output its discriminated frequency result is inputted to the clock controlling circuit 60, in which the clock frequency to be used by the intra-station and being different from the frequency used by the remote station is determined to send its clock output CKT to the optical transmitting circuit 20. In the timing chart of FIG. 4, the data coded by using the clock CKT having its frequency determined during the RST OFF is sent out when the RST is turned ON. In FIG. 4a, the clock having the same frequency as that of the clock used by itself is reproduced and outputted (as the CKR) by the crosstalk (i.e., the reflected beam). Then, after the start of the remote side, the signal transmitted therefrom is reproduced to set the normal line. In FIG. 4b, the data coded by using the clock CKT having its frequency determined during the RST OFF is sent out, after the RST is turned ON, to set the normal line. As has been described above, the setting of the communication line, which has been impossible under the influences of the reflected beam in the communication system using the single transmission circuit of the prior art can be automatically accomplished.

Figure 5A:
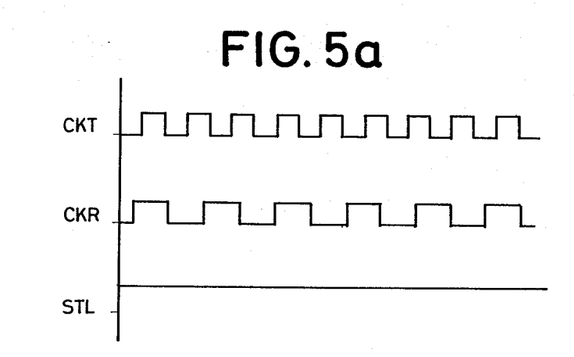
FIGS. 5a and 5b are further clock timing charts.
Figure 5B:
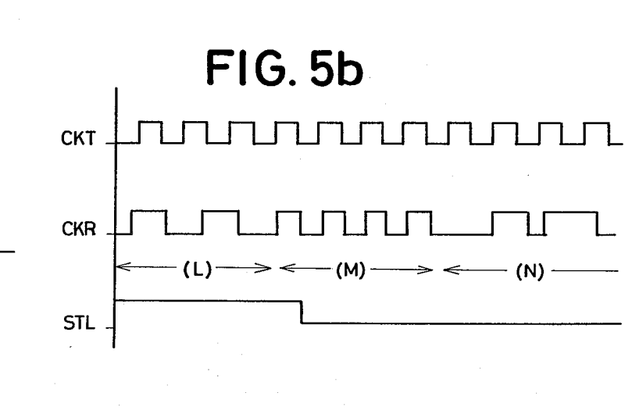

After the communication line has been set between the two systems by the procedures described above, the line state can be checked at all times by comparing the sent and received clock frequencies of the intra-station. In FIG. 1, the status signal indicating the clock frequency of the intra-station outputted from the clock controlling circuit 60 and the status signal STC indicating the clock frequency of the received signal outputted from the frequency discriminating circuit 50 are compared by the line diagnosing circuit 70 receiving the two status signals. Here, in case the two status signals are different and in case the received clock frequency is within a predetermined range, it is judged that the line is normal. In case the two are identical or in case the received clock frequency is outside the predetermined range, it is judged that the line is abnormal to cause a phenomenon in which the signal outputted from the intra-station is received by itself by the reflection so that no signal comes from the remote station. These are shown in the timing chart of FIG. 5. FIG. 5a shows the normal state, in which the transmitted clock CKT and the received clock CKR are different and in which the line status signal STL indicating the state is high. In FIG. 5b, on the other hand, it can be judged that the section (L) is in the normal state and that the section (M) is in the abnormal state in which the CKT and CKR are equal so that the output signal of the intra-station is received by its own through the crosstalk. Then, it is presumed that the remote-side system has its power supply stopped or troubled or that the fiber is broken. The section (N) is also in the abnormal state in which the CKR is irregular, and it is presumed that the abnormal state is caused as a result of the optical input at a lower level than the minimum received optical level of the optical receiving circuit.

Incidentally, the line diagnosing circuit is enabled to cope with the comparison between the CKT and CKR by the diagnosis of whether or not the CKT and CKR are identical in case two kinds of frequencies are used or whether or not the CKR is within the predetermined range in case the frequencies used are of two or more kinds.

An indicator 80 receives the status signal STL of the line diagnosing circuit 70 and has a function to inform the user of the line state by lighting a ready lamp, if the STL is high, and extinguish it if the STL is low. The indicator can naturally be exemplified by a system in which the lamp is lit when the abnormal state occurs.

The status signal STL is inputted to the interface circuit 90, too, and can be used for exchange with the external data terminal only when the STL is high, namely, the line is normal.

As has been described hereinbefore, the practical usability is remarkably improved because the optical output controlling circuit operates after the start (e.g., after the main power supply or the reset operation) so that the line is automatically set for this time period. On the other hand, the practical usability and the reliability can be drastically improved because the line diagnosing circuit can conduct the diagnosis of the circuit always and automatically merely by comparing the frequencies of the sent and received clocks of its own.

Figure 6:
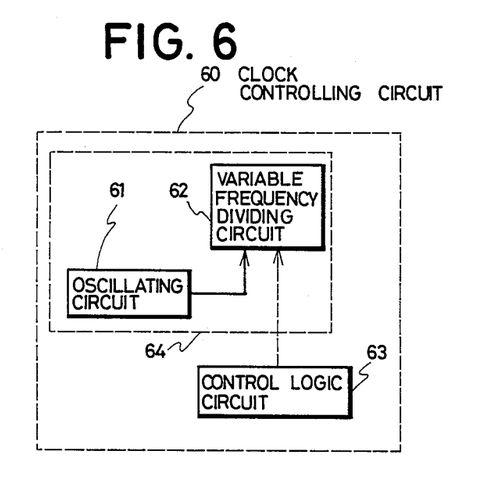
FIG. 6 is a block diagram of the clock controlling circuit.

In FIG. 1, the clock controlling circuit 60 is composed of an oscillating circuit 61, a variable frequency dividing circuit 62 and a control logic circuit 63. The oscillation circuit 61 oscillates with a frequency several times or more higher than the transmission clock frequency, and its frequency is divided at a predetermined ratio into the transmission clock frequency by the variable frequency dividing circuit 62. This frequency division ratio is controlled by the control logic circuit 63 which is constructed to select the clock having a frequency different from the received clock frequency judged by the frequency discriminating circuit 50 while the optical output controller 40 is stopping the output of the optical transmitting circuit 20. The frequency division ratio may desirably be exemplified by a simple value such as 1/9, 1/10 or 1/11, and the control logic circuit 63 selects the frequency division of 1/9, 1/10 or 1/11 in accordance with the clock of the remote side. In this case, the circuit itself can be realized exclusively by a simple counter and several gate circuits. With the construction described above, the frequency selection can be easily conducted so that the system can be so sufficiently flexible not only to reduce the circuit scale but also to easily cope with change in its clock frequency, if necessary. Incidentally, FIG. 6 shows another embodiment which is slightly modified from the clock controlling circuit having the construction of FIG. 1. In FIG. 6, the clock controlling circuit 60 uses the same reference numerals as those of FIG. 1. Reference numeral 64 denotes an oscillation circuit in which the oscillation circuit 61 and the variable frequency dividing circuit 62 are integrated into one package and which is newly developed in recent years so that its several types are commercially available. Thus, several systems having absolutely the same internal function as that of the present invention (as shown in FIG. 1) can be conceived, although they have different shapes, but should naturally be contained in the present invention.

Figure 7:
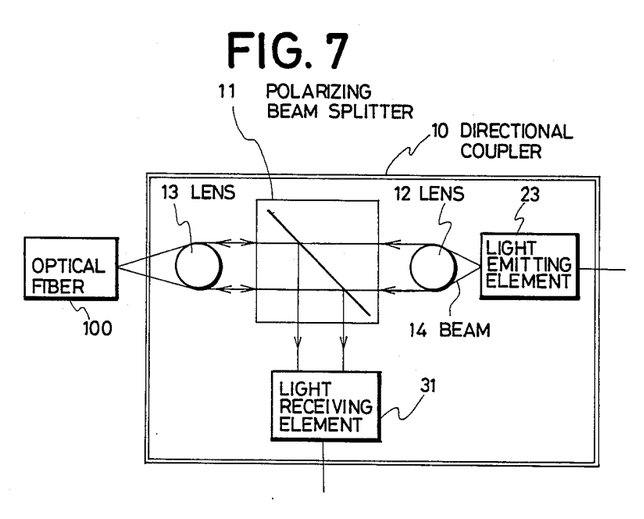
FIG. 7 is a schematic view of the directional coupler.

Incidentally, the single transmission line communication using the single optical wavelength, as in the present invention cannot be freed from an optical loss of 6 dB at the least because of the use of the directional coupler. This is because an optical loss of 3 dB at the least is invited at each pass through the directional coupler. This makes it necessary to efficiently input the beam outputted from the light emitting element to the optical fiber. The means for this necessity is shown in FIG. 7. As shown, the directional coupler 10 having the polarizing beam splitter 11 built therein contains the light emitting element 23 and the light receiving element 31 integrated with each other. The beam 14 emitted from the light emitting element is transformed into a parallel beam by the action of a lens 12, and this parallel beam is focused through the polarizing beam splitter 11 by the action of a lens 13 until it comes into the optical fiber 100. On the other hand, the beam emanating from the optical fiber 100 is transformed into a parallel beam by the lens 13, and this parallel beam is reflected by the polarizing beam splitter 11 to illuminate the light receiving element 31. In this construction, the optical path from the light emitting unit to the optical fiber can be shortened to make the beam effectively incident upon the optical fiber. As a result, the apparent light emitting output can be increased to contribute highly to the long distance transmission. The light emitting elements need not necessarily be integrated, but the effective light concentration resulting from the shown integration can be achieved by shortening the optical path to thereby contribute to the long distance transmission. The size reduction can also be achieved by that integration.

Figure 8A:
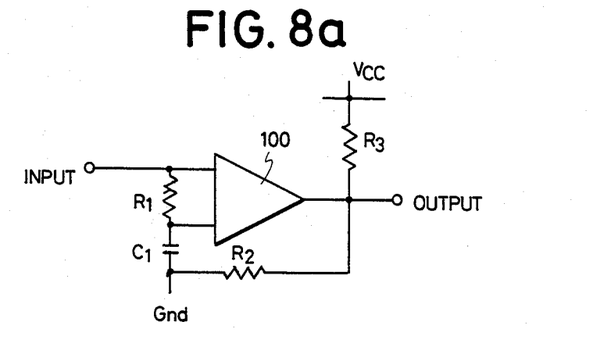
FIGS. 8a and 8b are circuit diagrams of the comparator.

An embodiment of the comparator 33 of FIG. 1 is shown in FIG. 8. FIG. 8a shows the type in which the threshold level of a comparator 100 varies following a time constant determined by $R_1 \cdot C_1$ at its input. This time constant has a value three to four times as large as the coded period. As a result, the threshold level crosses the substantial average value of the optical signal, as shown in FIG. 3a. The optimum value of the time constant depends upon the mark percentage of the code, and it has been confirmed that the threshold value begins to follow the average value of the optical signal by increasing the mark percentage to twice or more if it is 20 to 80%. This type is advantageous in that it can be realized by very simple circuitry and that it is well compatible with the other components of the present invention.

Figure 8B:
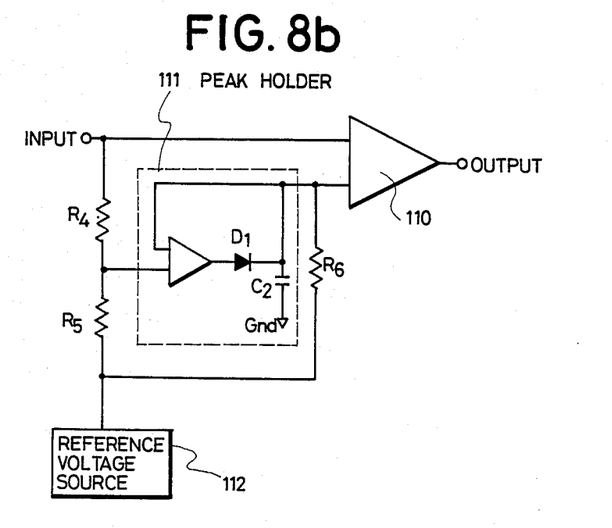

FIG. 8b shows the type in which the threshold level of a comparator 110 is set at a half of the input peak value by a peak holder 111. Reference numeral 112 denotes a reference voltage source which is used to make the drift, if caused at the input by the temperature, reluctant to influence. This type is more complex than that of FIG. 8a, but is suitable for the case in which it is to be realized by a monolithic IC or the like.

In the communication system according to the present invention, the employment of two values as the frequency used is suitable for simplifying the circuitry. In FIG. 1, more specifically, the variable frequency dividing circuit 62 and the control logic circuit 63 of the clock control circuit 60 and the frequency discriminating circuit 50 have alternate circuitries so that their constructions become very neat. In this case, it could be confirmed that the method of determining the two frequency values can provide satisfactory characteristics for the communication system if it satisfies the following equation (1):

$$\Delta m < \Delta F < \Delta M \quad (1),$$

wherein: $\Delta F$ designates the difference between the two frequencies; $\Delta m$ designates the minimum frequency difference that can be discriminated by the frequency discriminator; and $\Delta M$ designates the maximum frequency difference that can be decoded by the decoder of the optical receiver. In the equation (1), the upper limit ($\Delta M$) of the frequency difference is present in at the point the decoder commonly handles the data having clock components of the two frequencies so that more decoding mistakes due to the timing discrepancy become liable to occur as the frequency difference becomes the larger. On the contrary, the lower limit ($\Delta m$) is present at the point that the frequency discriminator produces more discrimination errors, when it discriminates the two, as the frequency difference is the smaller.

In case the communication system of the present invention is to be specifically made, several methods are conceivable for realizing the decoding circuit or the frequency discriminating circuit. Since the communication system can sufficiently perform its function, if it satisfies the equation (1), no matter what circuit might be adopted, the degree of freedom of design will increase.

In FIG. 1, the paths of the data and clocks are indicated by the solid lines, and the paths of the control signals are indicated by the broken lines. Despite this fact, however, it is naturally anticipated that the paths become more complex when the circuit is actually made and that lines or additional circuits for necessary signals, especially control signals increase. Moreover, a number of specific circuit types of the individual blocks can be conceived to satisfy the functions of the present invention. These concepts are natural to the engineers of electronic circuit design and are naturally within the scope of the present invention under such circumstances so long as they follow the gist of the present invention.

Since the single transmission line bidirectional communication system having the above-specified construction uses a polarizing beam splitter as the directional coupler, the near-end reflections in different polarizing directions are eliminated, and only the remote-end reflections may be taken into consideration. The beam transmitted from an intra-office has to go back and forth through an optical fiber and has its attenuation factor growing two times as large as that of the optical signal of the remote side in order that it may be reflected at the remote end and return to itself. As a result, the long distance communication can be accomplished by eliminating the near-end reflection at the polarizing beam splitter.

Since the optical signal is coded, moreover, it is outputted irrespective of the existence and content of the transmission data, and its optical intensity is substantially stabilized if it is averaged with time. Since the threshold level of the comparator is automatically set at a substantially average value of the input signal intensity by the automatic threshold value controlling circuit, still moreover, a weaker reflected beam is ignored.

Since the threshold value is automatically set, on the other hand, it is necessary neither to adjust the threshold level when the system is to be installed or to consider the influences such as the dispersion of the elements used and the temperature change.

Thus, the reflected beam is optically depressed at a low level, and the influences of the reflected beam are electrically eliminated. By both functions a full duplex bidirectional long distance communication through a single transmission line is made possible.

In the present optical communication system; furthermore, the output of the optical transmitting circuit is stopped at the time of switching on the power supply or the reset operation. As a result, the clock frequency becomes different from that of the remote side by selecting a clock frequency different from the reproduced clock frequency, which is inputted during the stop to the optical receiving circuit and judged by the frequency discriminating circuit, by the clock controlling circuit. This facilitates through frequency separation of electrical signal the discrimination between the signal from the remote-side communication system and its own output signal received by the crosstalk. In case no signal is inputted at first to the optical receiving circuit, on the other hand, a different clock frequency is adopted in the aforementioned procedure, after the remote-side system starts its operation, by adopting a clock of predetermined frequency and outputting it from the optical transmitting circuit so that the clock frequencies of the two become different from each other.

Even in case, moreover, the two communication systems are troubled by some cause during their operations and disabled to communicate with each other, the trouble can be detected merely by monitoring the reproduced clock frequency. More specifically, the line diagnosing circuit compares the reproduced clock frequency and the transmission clock frequency of its own and can judge, when the former becomes equal to the latter, that the remote-side communication system is not operating or the line of the optical fiber is so troubled, e.g., broken, that only the output beam of its own due to the crosstalk is inputted. When the reproduced clock frequency is different from the transmission clock frequency of its own and outside a determined range, it can be judged that the remote-side communication system is abnormally outputting or has its transmission line characteristics deteriorated drastically.

As has been described hereinbefore, it is possible to provide a highly reliable communication circuit which can better eliminate the influences of the crosstalk and can reliably grasp the state of the line with a single transmission line.

As has been described hereinbefore, according to the present invention, the single transmission line bidirectional long distance optical communication can be accomplished simply at a low cost to suppress the cost of the whole system by simply and remarkably reducing the influences of the reflected beam. It is further possible to automatically set the communication circuit which is composed of two of the present optical communication systems and a single optical transmission line between the data terminal systems and to monitor and trouble-shoot the circuit state at all times thereby to remarkably enhance the practical usability and the reliability.

What is claimed is:

1. A single transmission line bidirectional optical communication system comprising:
    a directional coupler including a polarizing beam splitter and an optical system for separating an optical output signal to be outputted to a single transmission line and an optical input signal coded with data and a remote clock signal to be inputted from said single transmission line;
    an optical transmitting circuit coupled to said directional coupler for coding original data by using a local clock signal of predetermined frequency and for subsequently converting the coded data into said optical output signal by means of a light emitting element;
    an optical receiving circuit coupled to said directional coupler for converting said optical input signal into an electric signal, for amplifying the electric signal, for recognizing the amplified electric signal through a comparator including an automatic threshold controlling circuit for automatically setting a threshold level at a substantially average value of the amplified electric signal intensities, and for subsequently decoding the amplified electric signal to reproduce and output the remote clock signal and the data;
    an optical output controlling circuit coupled to said optical transmitting circuit for controlling whether or not said optical output signal is to be outputted from said optical transmitting circuit to said directional coupler;
    a frequency discriminating circuit coupled to said optical receiving circuit for discriminating the frequency of said reproduced remote clock signal to output a status signal indicating said frequency; and
    a clock controlling circuit coupled to said frequency discriminating circuit for determining the frequency of the local clock signal by the status signal coming from said frequency discriminating circuit when said optical output signal is not being transmitted from said optical transmitting circuit by the control of said optical output controlling circuit and to output said local clock signal.

2. A single transmission line bidirectional optical communication system of claim 1, wherein said directional coupler and the light emitting element in said optical transmitting circuit are integrated with each other.

3. A single transmission line bidirectional optical communication system of claim 1, wherein said optical output controlling circuit interrupts the optical signal output from said optical transmitting circuit immediately after switching on a power supply or a resetting operation and outputs the optical output signal after a lapse of a predetermined time period.

4. A single transmission line bidirectional optical communication system of claim 1, comprising said clock controlling circuit composed of at least an oscillation circuit, a variable frequency dividing circuit and a control logic circuit, wherein the oscillation circuit is for outputting a clock signal of predetermined frequency, the variable frequency dividing circuit is for dividing the frequency of said clock signal at an arbitrary ratio, and the control logic circuit is for determining the frequency division rate of said variable frequency dividing circuit in accordance with the status signal coming from said frequency discriminating circuit.

5. A single transmission line bidirectional optical communication system of claim 1, wherein the automatic threshold controlling circuit in said optical receiving circuit is constructed such that its comparator has its threshold value level varied with an input by using an RC circuit which has a time constant several times or more larger than the code period of data.

6. A single transmission line bidirectional optical communication system of claim 1, wherein the automatic threshold controlling circuit in said optical receiving circuit is comprised of a peak holder.

7. A single transmission line bidirectional optical communication system of claim 1, wherein the frequency clock frequency outputted from said clock controlling circuit has two values.

8. A single transmission line bidirectional optical communication system of claim 1, wherein said local clock signal frequency has two values, and wherein the following inequalities hold, if the difference of said two frequency values is denoted by $\Delta F$, the minimum frequency difference to be recognized by said frequency discriminating circuit by $\Delta m$, and the maximum frequency difference to be decoded by said optical receiving by $\Delta M$:

$\Delta M < \Delta F < \Delta m.$

9. A single transmission line bidirectional optical communication system of claim 1, wherein the data encoding is conducted within 20% to 80% mark percentage.

10. A single transmission line bidirectional optical communication system comprising:
- a directional coupler including a polarizing beam splitter and an optical system for separating an optical output signal to be outputted to a single transmission line and an optical input signal coded with data and a remote clock signal to be inputted from said single transmission line;
- an optical transmitting circuit coupled to said directional coupler for coding original data by using a local clock signal of predetermined frequency and for subsequently converting the coded data into said optical output signal by means of a light emitting element;
- an optical receiving circuit coupled to said directional coupler for converting said optical input signal into an electric signal, for recognizing the electrical signal through a comparator including an automatic threshold controlling circuit for automatically setting a threshold level at a substantially average value of the electric signal intensities, and for subsequently decoding the electric signal to reproduce and output the remote clock signal and data;
- an optical output controlling circuit coupled to said optical transmitting circuit for controlling whether or not said optical output signal is to be outputted from said optical transmitting circuit to said directional coupler;
- a frequency discriminating circuit coupled to said optical receiving circuit for discriminating the frequency of said reproduced remote clock signal to output a first status signal indicating said frequency; and
- a clock controlling circuit coupled to said frequency discriminating circuit for determining the frequency of the local clock signal by the first status signal coming from said frequency discriminating circuit when said optical output signal is not being transmitted from said optical transmitting circuit by the control of said optical output controlling circuit and to output the local clock signal (CKT) and a second status signal (STC) indicating the frequency of the local clock signal; and
- a line diagnosing circuit coupled to said clock controlling circuit for diagnosing if a communication line is put in a normal state from said first status signal coming from said frequency discriminating circuit when said optical output signal is transmitted from said optical transmitting circuit by the control of said optical output controlling circuit, and said second status signal coming from said clock controlling circuit.

11. A single transmission line bidirectional optical communication system of claim 10, comprising said clock controlling circuit composed of at least an oscillation circuit, a variable frequency dividing circuit and a control logic circuit, wherein the oscillation circuit is for outputting a clock signal of predetermined frequency, the variable frequency dividing circuit is for dividing the frequency of said clock signal at an arbitrary ratio, and the control logic circuit is for determining the frequency division rate of said variable frequency dividing circuit in accordance with the first status signal coming from said frequency discriminating circuit and is for outputting the second status signal indicating the value of said frequency division ratio.

12. A single transmission line bidirectional optical communication system of claim 10, wherein said line diagnosing circuit outputs a status signal indicating that a communication line is normal, in case a reception clock frequency is different from a transmission clock frequency and within a predetermined range which is judged from both the second status signal outputted from said clock controlling circuit indicating its own transmission clock frequency and the first status signal outputted from said frequency discriminating circuit indicating a reception clock frequency.

13. A single transmission line bidirectional optical communication system of claim 1, wherein said line diagnosing circuit outputs a status signal indicating that a communication line is abnormal, in case a reception clock frequency is either identical to a transmission clock frequency which is judged from both a status signal outputted from said clock controlling circuit and indicating its own transmission clock frequency and a status signal outputted from said frequency discriminating circuit and indicating a reception clock frequency or outside a predetermined range.

14. A single transmission line bidirectional optical communication system, comprising:
- optical transmitting means receptive of a local clock signal for coding data into an optical output signal;
- optical receiving means for converting an optical input signal representing coded data and a remote clock signal into the data and the remote clock signal;
- directional coupling means receptive of the optical output signal from the transmitting means and the optical input signal from a single transmission line for directing the optical output signal to the single transmission line and the optical input signal to the receiving means;
- means for selectively inhibiting the transmitting means;
- means for determining the frequency of the remote clock signal and for producing a status signal corresponding to the determined frequency; and
- clock controlling means receptive of the status signal for varying the frequency of the local clock signal to differ from that of the remote clock signal when the transmitting means is inhibited and for applying the local clock signal to the transmitting means.

15. The system according to claim 14, wherein the clock controlling means has means for producing a second status signal corresponding to the frequency of the local clock signal and further comprising line diagnosing means receptive of the first and second status signals when the transmitting means is not inhibited for indicating a problem in the transmission line.

16. The system according to claim 14, wherein the receiving means further comprises comparator means for comparing the optical input signal to a threshold level which is at substantially average value of the optical input signal amplitude.

* * * * *